US010384790B2

(12) United States Patent
Baldwin et al.

(10) Patent No.: US 10,384,790 B2
(45) Date of Patent: Aug. 20, 2019

(54) ENGINE MOUNT ASSEMBLIES FOR AIRCRAFT

(71) Applicant: Bell Helicopter Textron Inc., Fort Worth, TX (US)

(72) Inventors: Tyler Wayne Baldwin, Fort Worth, TX (US); John Elton Brunken, Jr., Fort Worth, TX (US); Matthew Carl VanBuskirk, Fort Worth, TX (US); Bart Marcus Shafer, Fort Worth, TX (US); Bruce Bennett Bacon, Fort Worth, TX (US)

(73) Assignee: Bell Textron Inc., Fort Worth, TX (US)

( * ) Notice: Subject to any disclaimer, the term of this patent is extended or adjusted under 35 U.S.C. 154(b) by 422 days.

(21) Appl. No.: 15/409,971

(22) Filed: Jan. 19, 2017

(65) Prior Publication Data
US 2017/0217595 A1 Aug. 3, 2017

Related U.S. Application Data

(60) Provisional application No. 62/289,766, filed on Feb. 1, 2016.

(51) Int. Cl.
B64D 27/26 (2006.01)
B64C 29/00 (2006.01)
(Continued)

(52) U.S. Cl.
CPC ............. B64D 27/26 (2013.01); B64C 27/28 (2013.01); B64C 29/0033 (2013.01); B64D 27/12 (2013.01); B64D 2027/262 (2013.01)

(58) Field of Classification Search
CPC ........ B64D 27/26; B64D 27/18; B64D 27/06; B64D 27/12; B64D 2027/262; B64D 2027/266; B64D 2027/268
See application file for complete search history.

(56) References Cited

U.S. PATENT DOCUMENTS 1,815,442 A 7/1931 Masury
1,860,444 A 5/1932 Woolson
(Continued)

FOREIGN PATENT DOCUMENTS

EP 0761945 B1 5/2001
EP 2837558 A1 2/2015
(Continued)

OTHER PUBLICATIONS

European Search Report; Application No. 17153860.6; dated Jun. 23, 2017.
(Continued)

Primary Examiner — Philip J Bonzell
Assistant Examiner — Tye William Abell
(74) Attorney, Agent, or Firm — Lawrence Youst PLLC

(57) ABSTRACT

An engine mount assembly for coupling an engine to an airframe includes a torsion bar, a lateral movement control assembly and a vertical movement control assembly. The torsion bar has a torsional stiffness and is coupled between the engine and the airframe such that torsional movement of the engine causes torsion in the torsion bar. The lateral movement control assembly has a lateral stiffness and is coupled between the torsion bar and the airframe such that lateral movement of the engine causes rotation of the torsion bar which reacts on lateral movement control assembly. The vertical movement control assembly has a vertical stiffness and is coupled between the engine and the airframe such that vertical movement of the engine reacts on the vertical movement control assembly. The engine mount assembly, thereby enables torsional, lateral and vertical movement of the engine to be independently controlled.

16 Claims, 11 Drawing Sheets

(51) Int. Cl.
*B64D 27/12* (2006.01)
*B64C 27/28* (2006.01)

(56) References Cited

U.S. PATENT DOCUMENTS

| | | |
|---|---|---|
| 2,028,549 A | 1/1936 | Lord |
| 2,523,504 A | 9/1950 | Ford, Jr. |
| 2,715,508 A | 8/1955 | Small, Jr. |
| 2,722,391 A | 11/1955 | Kreighoff |
| 2,724,948 A | 11/1955 | Hiscock et al. |
| 3,288,404 A | 11/1966 | Schmidt et al. |
| 3,318,554 A | 5/1967 | Ward et al. |
| 3,727,862 A | 4/1973 | Kaufhold et al. |
| 3,836,100 A | 9/1974 | Von Hardenberg et al. |
| 3,844,115 A | 10/1974 | Freid |
| 4,013,246 A | 3/1977 | Nightingale |
| 4,097,011 A | 6/1978 | White |
| 4,111,386 A | 9/1978 | Kenigsberg et al. |
| 4,725,019 A | 2/1988 | White |
| 4,742,975 A * | 5/1988 | Pachomoff ............ B64D 27/26 244/54 |
| 5,806,792 A * | 9/1998 | Brossier ................ B64D 27/18 244/54 |
| 8,646,724 B2 * | 2/2014 | Bonnet ................ B64D 27/26 188/378 |
| 2011/0259997 A1 | 10/2011 | Marechal |
| 2012/0012732 A1 * | 1/2012 | Zameroski ............ B64D 27/26 248/638 |
| 2015/0360788 A1 * | 12/2015 | Hellegouarch ........ B64D 27/26 244/54 |
| 2018/0281980 A1 * | 10/2018 | Riviere ................ B64D 27/10 |

FOREIGN PATENT DOCUMENTS

| | | |
|---|---|---|
| FR | 2100606 A1 | 3/1972 |
| WO | 2014111654 A1 | 7/2014 |

OTHER PUBLICATIONS

European Examination Report; Application No. 17153860.6; dated Jul. 13, 2017.

* cited by examiner

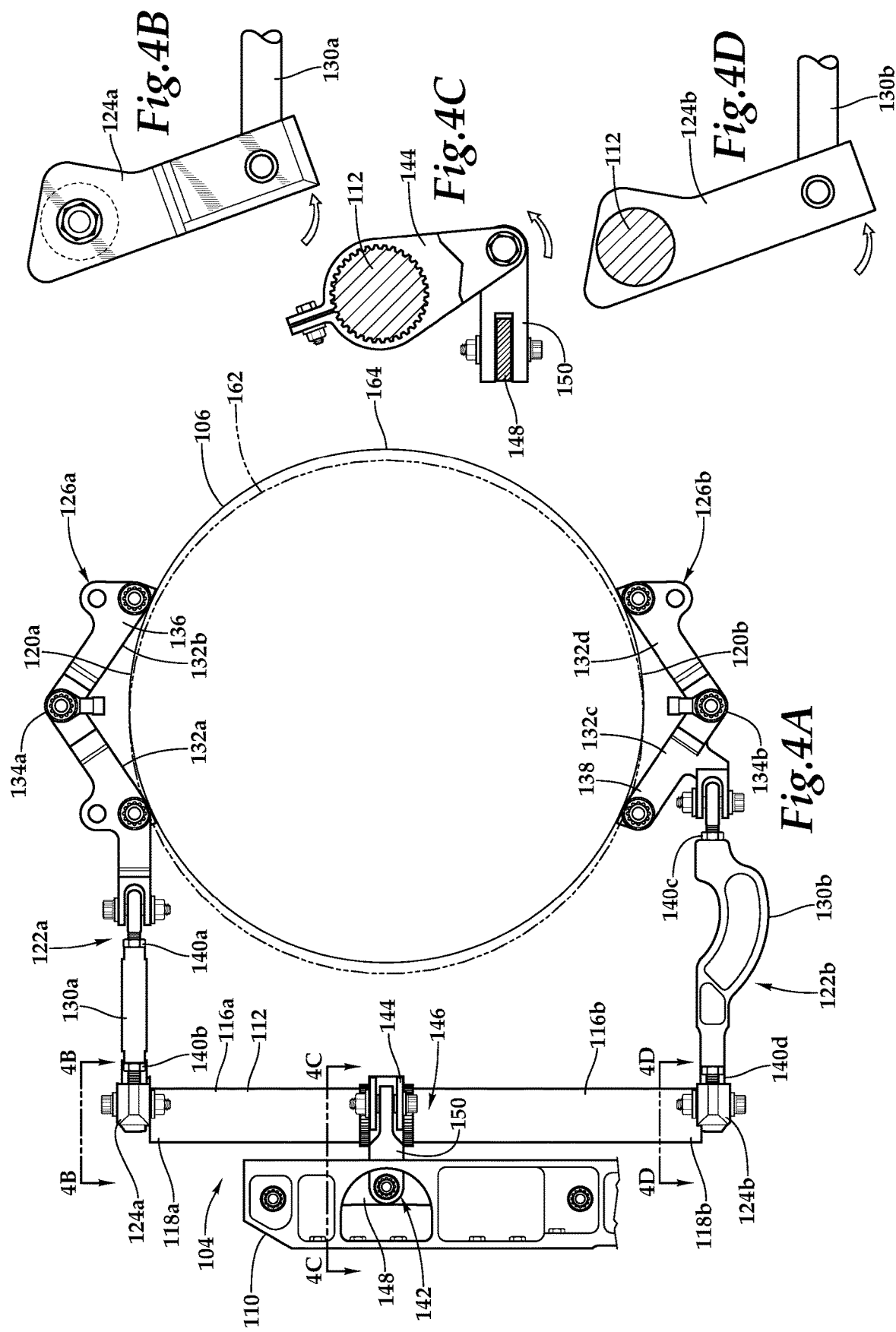

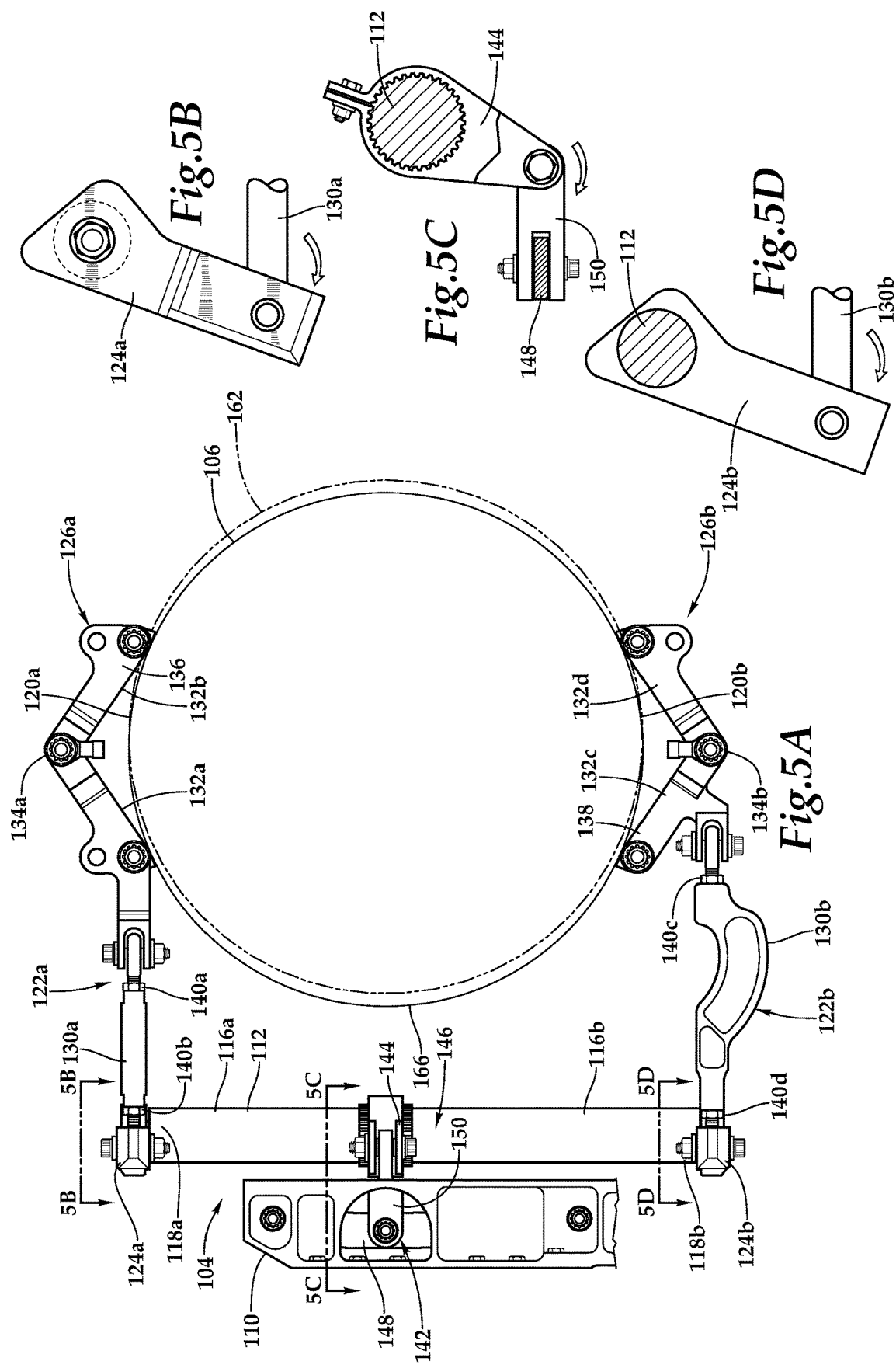

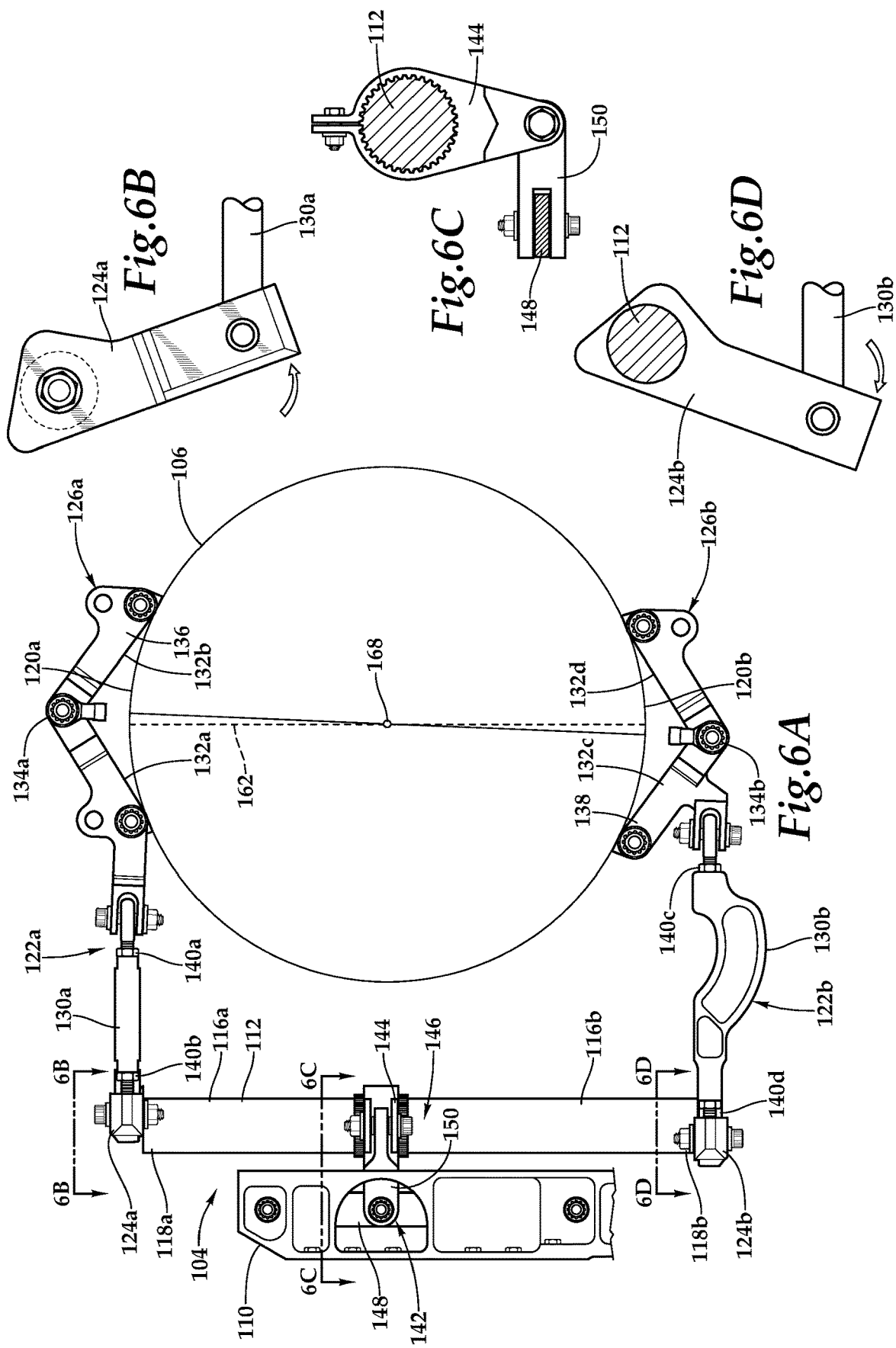

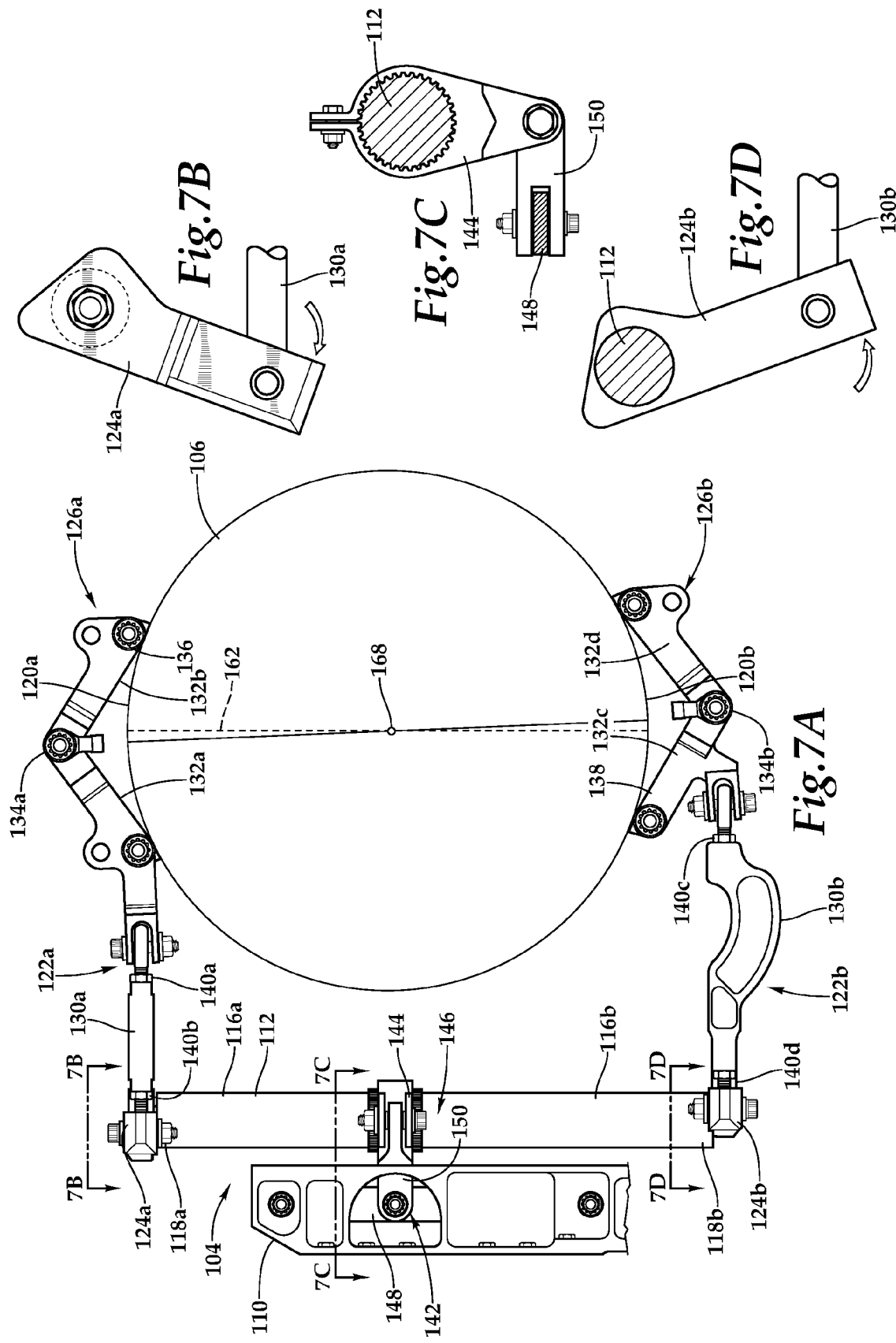

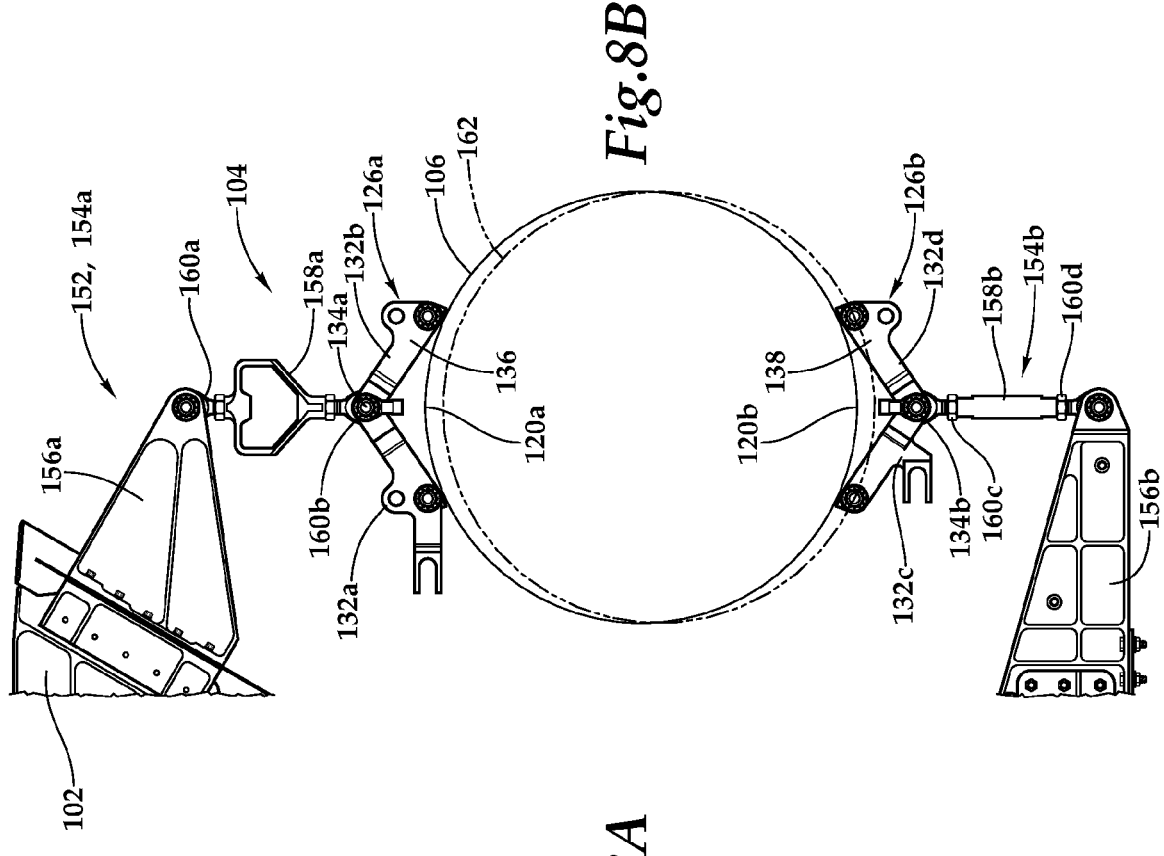
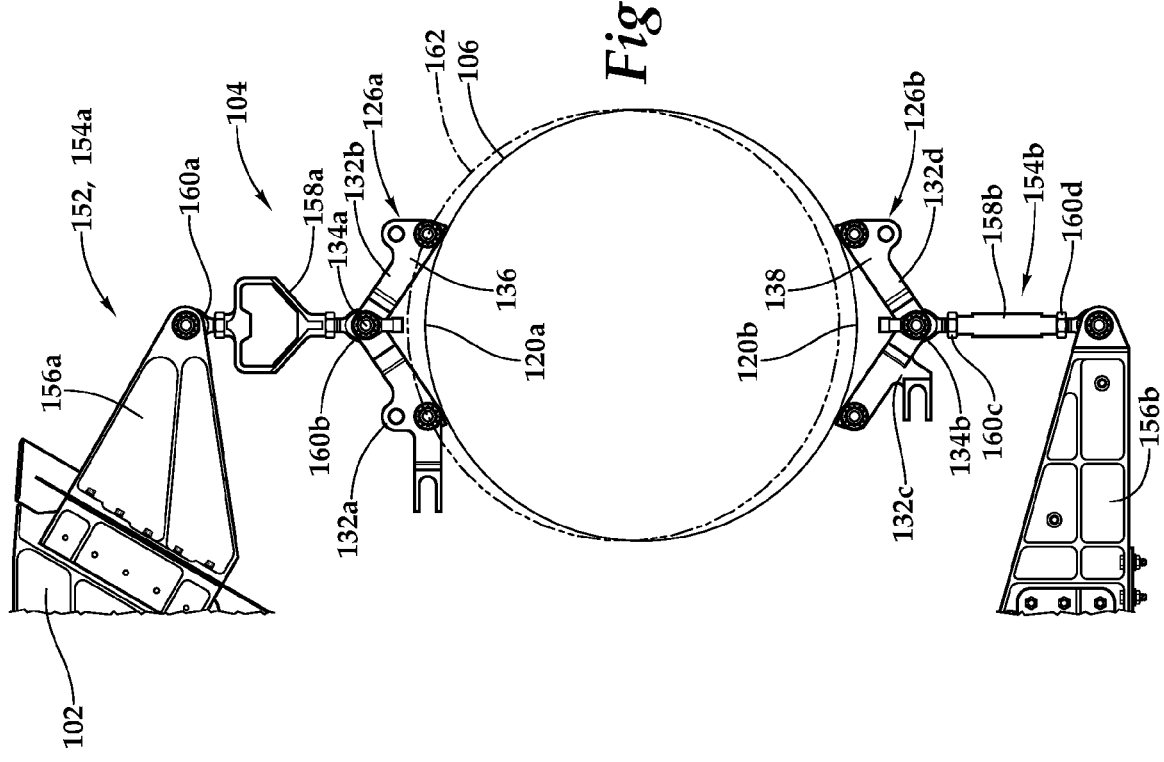

ENGINE MOUNT ASSEMBLIES FOR AIRCRAFT

CROSS-REFERENCE TO RELATED APPLICATIONS

The present application claims the benefit of U.S. Provisional Application No. 62/289,766, filed Feb. 1, 2016, the contents of which are hereby incorporated by reference.

TECHNICAL FIELD OF THE DISCLOSURE

The present disclosure relates, in general, to engine mount assemblies for use on aircraft and, in particular, to engine mount assemblies for controlling engine motion or vibration along various degrees of freedom.

BACKGROUND

An aircraft may have one or more engines that are secured within or against another portion of the aircraft, such as a nacelle or airframe. Due to their large size, power output and other characteristics, aircraft engines may move or vibrate during operation. Engine mounts, in addition to securing engines on an aircraft, can be used to control or absorb an engine's vibrations to prevent structural instability during flight. Such instability may occur on rotorcraft, for example, if the rotor and associated engine have conflicting modes of vibration. Further complicating matters, engines may vibrate along multiple degrees of freedom at different respective magnitudes, including movement in the lateral, vertical and torsional directions. Load, motion, spatial and other operational constraints may require engine movement to be tuned or controlled in the vertical, lateral, and torsional directions. Current engine mounts, however, fail to allow for an engine's movement along the various degrees of freedom to be independently controlled. For example, current engine mounts may have stiffness in the torsional direction and stiffness in the lateral direction that are coupled to one another such that changing the stiffness in the torsional direction affects the stiffness in the lateral direction, or vice versa, making lateral and torsional engine movement difficult or impossible to independently control. Accordingly, a need has arisen for engine mounts that allow motion or vibration along the various degrees of motion of an engine to be independently tuned.

SUMMARY

In a first aspect, the present disclosure is directed to an engine mount assembly for coupling an engine to an airframe. The engine mount assembly includes a torsion bar coupled between the engine and the airframe. The torsion bar has a torsional stiffness and experiences torsion in response to torsional movement of the engine. The torsional movement of the engine is independently controllable based on the torsional stiffness of the torsion bar.

In some embodiments, the engine mount assembly may include a first arm assembly coupling a first end of the torsion bar to the engine and a second arm assembly coupling a second end of the torsion bar to the engine. In such embodiments, the torsion bar may be mounted vertically such that a top arm assembly couples the top end of the torsion bar to the top side of the engine and a bottom arm assembly couples the bottom end of the torsion bar to the bottom side of the engine. Alternatively or additionally, the first and second arm assemblies may each include a scissor mount attachable to the engine, an end bell crank coupled to one of the ends of the torsion bar and a linkage coupling the scissor mount to the end bell crank. In these embodiments, the first and second arm assemblies may each include first and second spherical bearings such that for each of the first and second arm assemblies, a first end of the linkage is movably coupled to the scissor mount via the first spherical bearing and a second end of the linkage is movably coupled to the end bell crank via the second spherical bearing. In certain embodiments, the engine is further subject to lateral movement and the end bell cranks are each fixedly coupled to one of the ends of the torsion bar such that torsional movement of the engine causes the end bell cranks to rotate in opposite directions, thereby causing the torsion bar to experience torsion while lateral movement of the engine causes the end bell cranks to rotate in the same direction, thereby causing the torsion bar to rotate.

In some embodiments, the engine is further subject to lateral and vertical movement wherein torsional movement of the engine is independently controllable based on the torsional stiffness of the torsion bar while lateral and vertical movement of the engine is substantially unaffected by the torsional stiffness of the torsion bar. In certain embodiments, torsional movement of the engine may include a torsional mode of vibration of the engine which may be independently controllable based on the torsional stiffness of the torsion bar. In some embodiments, the engine mount assembly may include a support spine coupled to the airframe and at least one torsion bar bearing mount that is coupled to the support spine and rotatably coupled to the torsion bar. In such embodiments, the torsion bar may have upper and lower portions and the at least one torsion bar bearing mount may be upper and lower torsion bar bearing mounts with the upper torsion bar bearing mount rotatably coupled to the upper portion of the torsion bar and the lower torsion bar bearing mount rotatably coupled to the lower portion of the torsion bar.

In a second aspect, the present disclosure is directed to an engine mount assembly for coupling an engine to an airframe. The engine mount assembly includes a torsion bar and a lateral movement control assembly. The torsion bar is coupled between the engine and the airframe. The torsion bar has a torsional stiffness and experiences torsion in response to torsional movement of the engine such that torsional movement of the engine is controllable based on the torsional stiffness of the torsion bar. The lateral movement control assembly is coupled between the torsion bar and the airframe. The lateral movement control assembly has a lateral stiffness and reacts to rotation of the torsion bar in response to lateral movement of the engine such that lateral movement of the engine is controllable based on the lateral stiffness of the lateral movement control assembly, thereby enabling torsional and lateral movement of the engine to be independently controlled.

In some embodiments, the lateral movement control assembly may include a middle bell crank fixedly coupled to the torsion bar and a spring coupled to the middle bell crank, the spring having the lateral stiffness to control lateral movement of the engine. In certain embodiments, the middle bell crank is fixedly coupled to a middle section of the torsion bar such that the middle bell crank rotates in response to rotation of the torsion bar caused by lateral movement of the engine but remains substantially stationary in response to torsion of the torsion bar caused by torsional movement of the engine. In some embodiments, the engine is subject to lateral and torsional modes of vibration such that the lateral mode of vibration of the engine is controllable based on the lateral stiffness of the lateral movement control assembly and the torsional mode of vibration of the engine is controllable based on the torsional stiffness of the torsion bar, thereby enabling the lateral and torsional modes of vibration to be independently controlled.

In a third aspect, the present disclosure is directed to an engine mount assembly for coupling an engine to an airframe. The engine mount assembly includes a torsion bar, a lateral movement control assembly and a vertical movement control assembly. The torsion bar is coupled between the engine and the airframe. The torsion bar has a torsional stiffness and experiences torsion in response to torsional movement of the engine such that torsional movement of the engine is controllable based on the torsional stiffness of the torsion bar. The lateral movement control assembly is coupled between the torsion bar and the airframe. The lateral movement control assembly has a lateral stiffness and reacts to rotation of the torsion bar in response to lateral movement of the engine such that lateral movement of the engine is controllable based on the lateral stiffness of the lateral movement control assembly. The vertical movement control assembly is coupled between the engine and the airframe. The vertical movement control assembly has a vertical stiffness such that vertical movement of the engine is controllable based on the vertical stiffness of the vertical movement control assembly, thereby enabling torsional, lateral and vertical movement of the engine to be independently controlled.

In some embodiments, the vertical movement control assembly may include a support arm and a vertical support linkage. In certain embodiments, the vertical movement control assembly may include a top vertical movement control assembly coupled between a top side of the engine and the airframe and a bottom vertical movement control assembly coupled between a bottom side of the engine and the airframe with the top and bottom vertical movement control assemblies each having a vertical stiffness such that vertical movement of the engine is controllable based on the vertical stiffnesses of the top and bottom vertical movement control assemblies. In such embodiments, the top vertical movement control assembly may include a top support arm coupled to the airframe and a top vertical support linkage coupling the top support arm to the top side of the engine via a top scissor mount while the bottom vertical movement control assembly may include a bottom support arm coupled to the airframe and a bottom vertical support linkage coupling the bottom support arm to the bottom side of the engine via a bottom scissor mount. In these embodiments, a top end of the top vertical support linkage may be moveably coupled to the top support arm via a first spherical bearing, a bottom end of the top vertical support linkage may be moveably coupled to a fulcrum of the top scissor mount via a second spherical bearing, a top end of the bottom vertical support linkage may be moveably coupled to a fulcrum of the bottom scissor mount via a third spherical bearing and a bottom end of the bottom vertical support linkage may be moveably coupled to the bottom support arm via a fourth spherical bearing.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 4A-4D and 5A-5D are various views of an engine mount assembly responding to lateral movement of an engine in accordance with embodiments of the present disclosure;

FIGS. 6A-6D and 7A-7D are various views of an engine mount assembly responding to torsional movement of an engine in accordance with embodiments of the present disclosure; and FIGS. 8A-8B are front views of an engine mount assembly responding to vertical movement of an engine in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Figure 1A:
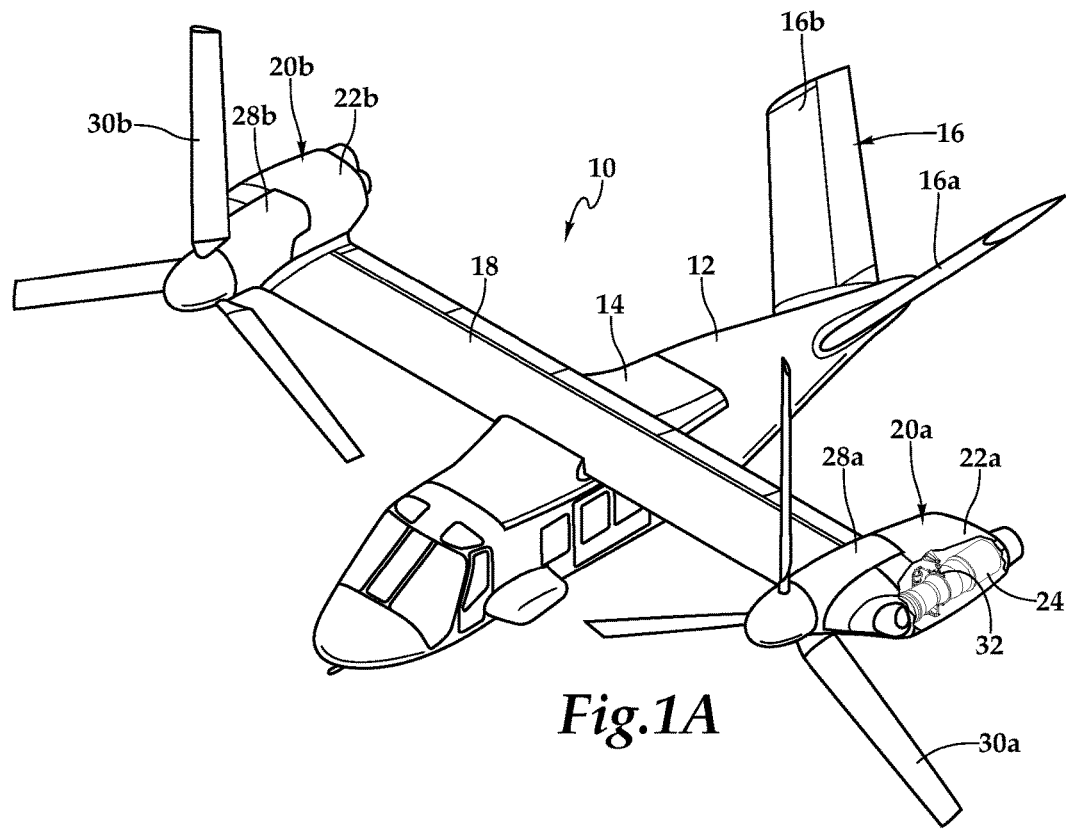
FIGS. 1A-1B are schematic illustrations of a tiltrotor aircraft utilizing engine mount assemblies in accordance with embodiments of the present disclosure.
Figure 1B:
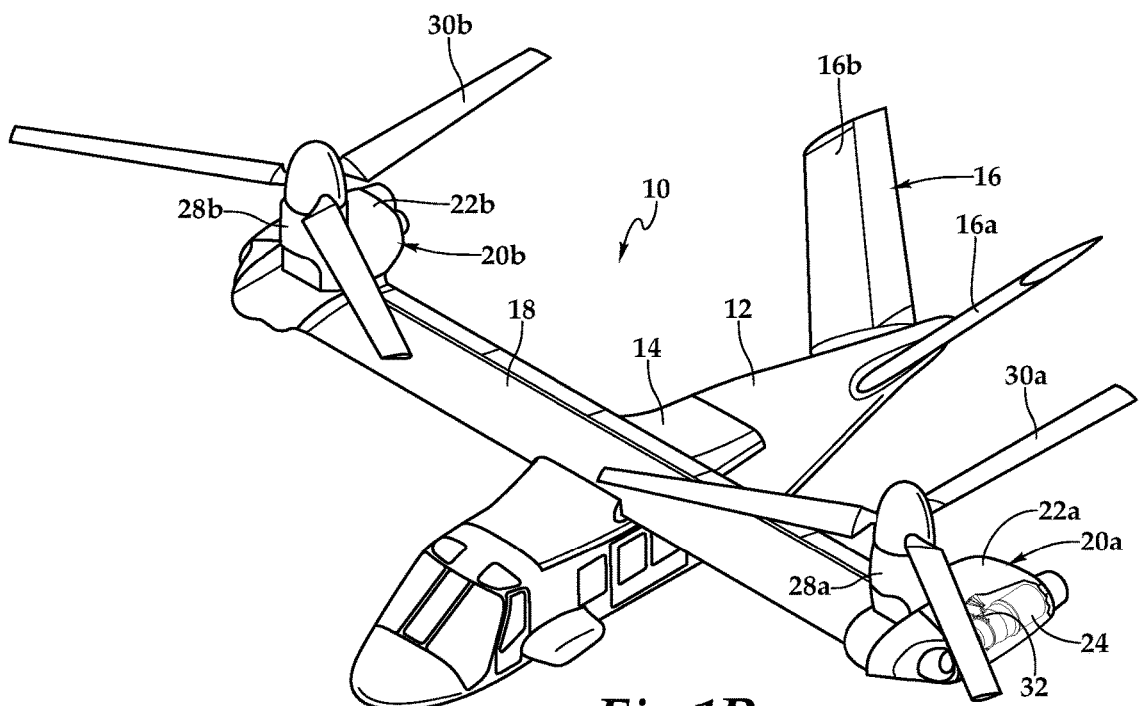

Referring to FIGS. 1A-1B and 2A-2B in the drawings, a tiltrotor aircraft is schematically illustrated and generally designated 10. Aircraft 10 includes a fuselage 12, a wing mount assembly 14 and a tail assembly 16 including rotatably mounted tail members 16a, 16b having control surfaces operable for horizontal and/or vertical stabilization during forward flight. A wing member 18 is supported by wing mount assembly 14. Located at outboard ends of wing member 18 are propulsion assemblies 20a, 20b. Propulsion assembly 20a includes a nacelle depicted as fixed pylon 22a that houses an engine 24 and a transmission 26. Thus, the nacelle is fixed relative to wing member 18. In addition, propulsion assembly 20a includes a mast assembly 28a that is rotatable relative to fixed pylon 22a between a generally horizontal orientation, as best seen in FIG. 1A, and a generally vertical orientation, as best seen in FIG. 1B. Propulsion assembly 20a also includes a proprotor assembly 30a that is rotatable relative to mast assembly 28a responsive to torque and rotational energy provided via a rotor hub assembly and drive system mechanically coupled to engine 24 and transmission 26. Similarly, propulsion assembly 20b includes a nacelle depicted as fixed pylon 22b that houses an engine and transmission, a mast assembly 28b that is rotatable relative to fixed pylon 22b and a proprotor assembly 30b that is rotatable relative to mast assembly 28b responsive to torque and rotational energy provided via a rotor hub assembly and drive system mechanically coupled to the engine and transmission housed by fixed pylon 22b. As used herein, including in the claims, the term "coupled" may include direct or indirect coupling by any means, including moving and/or non-moving mechanical connections.

FIG. 1A illustrates aircraft 10 in airplane or forward flight mode, in which proprotor assemblies 30a, 30b are rotating in a substantially vertical plane to provide a forward thrust enabling wing member 18 to provide a lifting force responsive to forward airspeed, such that aircraft 10 flies much like a conventional propeller driven aircraft. Unless otherwise indicated, as used herein, "or" does not require mutual exclusivity. FIG. 1B illustrates aircraft 10 in helicopter or vertical takeoff and landing (VTOL) flight mode, in which proprotor assemblies 30a, 30b are rotating in a substantially horizontal plane to provide a lifting thrust, such that aircraft 10 flies much like a conventional helicopter. It should be appreciated that aircraft 10 can be operated such that proprotor assemblies 30a, 30b are selectively positioned between forward flight mode and VTOL flight mode, which can be referred to as a conversion flight mode. Even though aircraft 10 has been described as having one engine in each fixed pylon 22a, 22b, it should be understood by those having ordinary skill in the art that other engine arrangements are possible and are considered to be within the scope of the present disclosure including, for example, having a single engine which may be housed within fuselage 12 that provides torque and rotational energy to both proprotor assemblies 30a, 30b.

Engine 24 is mounted within fixed pylon 22a by engine mount assembly 32. Engine mount assembly 32 may be mounted onto an aft portion of engine 24, as illustrated. Engine 24 is subject to movement, including vibration, in multiple directions, or degrees of freedom, including the lateral, vertical and torsional directions. When engine 24 vibrates at particular frequencies, structural instability of fixed pylon 22a or another portion of aircraft 10 can result. For example, structural instability can result if engine 24 vibrates at an excitation frequency originating from proprotor assembly 30a. Engine mount assembly 32 controls movement, including vibration frequencies, of engine 24 by tailoring the stiffness of various constituent structures or components to counteract the movement of engine 24 in the lateral, vertical and torsional directions. Furthermore, engine mount assembly 32 is capable of independently controlling the movement of engine 24 in any one direction, while not affecting the movement of engine 24 in any other direction, thereby decoupling control of the lateral, vertical and torsional movement of engine 24 from each other. For example, engine mount assembly 32 is capable of increasing the stiffness working against the lateral movement of engine 24 without affecting the stiffness working against the torsional movement of engine 24, or vice versa. Such independent control allows engine mount assembly 32 to, for example, more easily meet operational vibration ranges or targets of engine 24 in each of the lateral, vertical and torsional directions. Engine mount assembly 32 provides the capability of controlling stiffness in the lateral, vertical and torsional load directions to tailor dynamic tuning of engine 24, and thus achieve reductions in oscillatory loading and vibration.

Figure 2A:
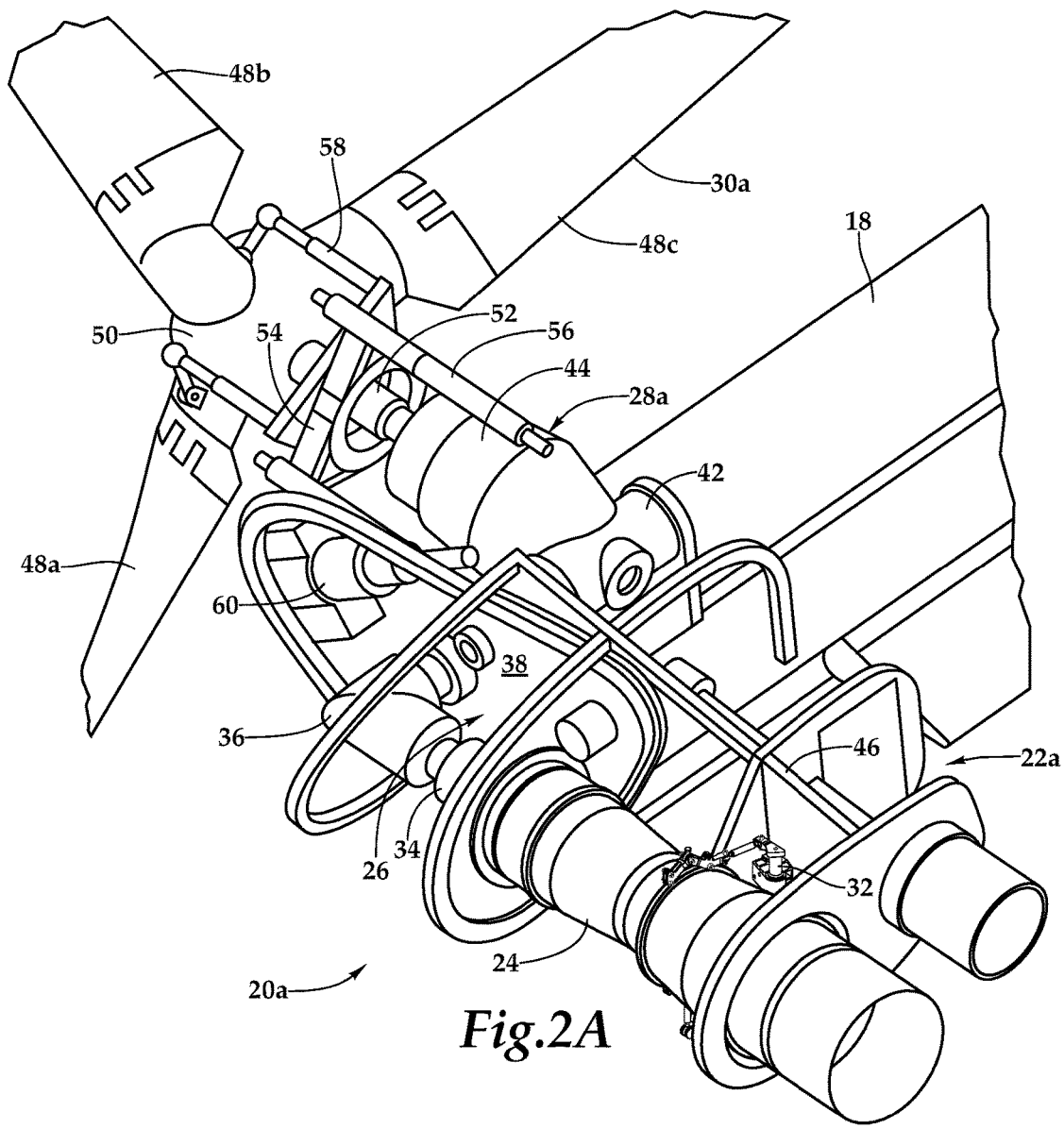
FIG. 2A is an isometric view of an exemplary propulsion system for a tiltrotor aircraft utilizing an engine mount assembly in accordance with embodiments of the present disclosure.
Figure 2B:
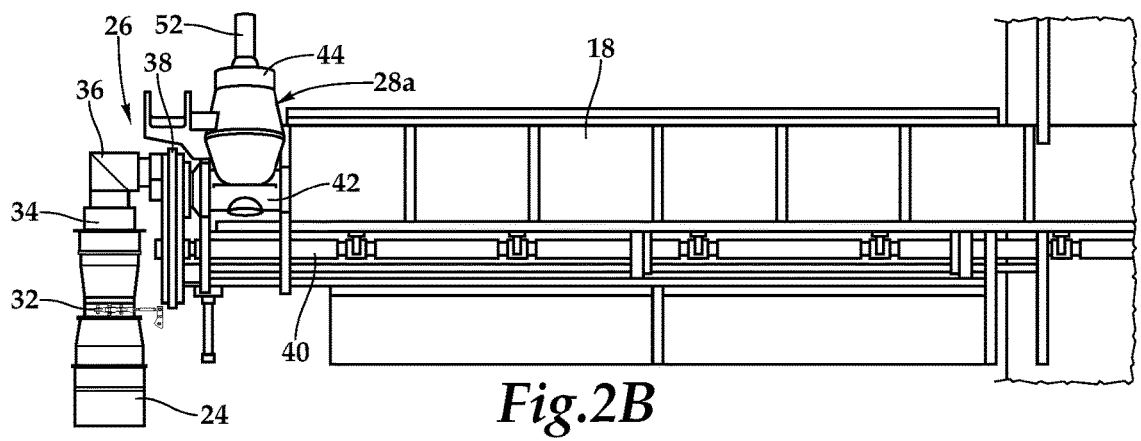
FIG. 2B is a top view of an exemplary wing section of a tiltrotor aircraft that includes an engine mount assembly in accordance with embodiments of the present disclosure.
Figure 3A:
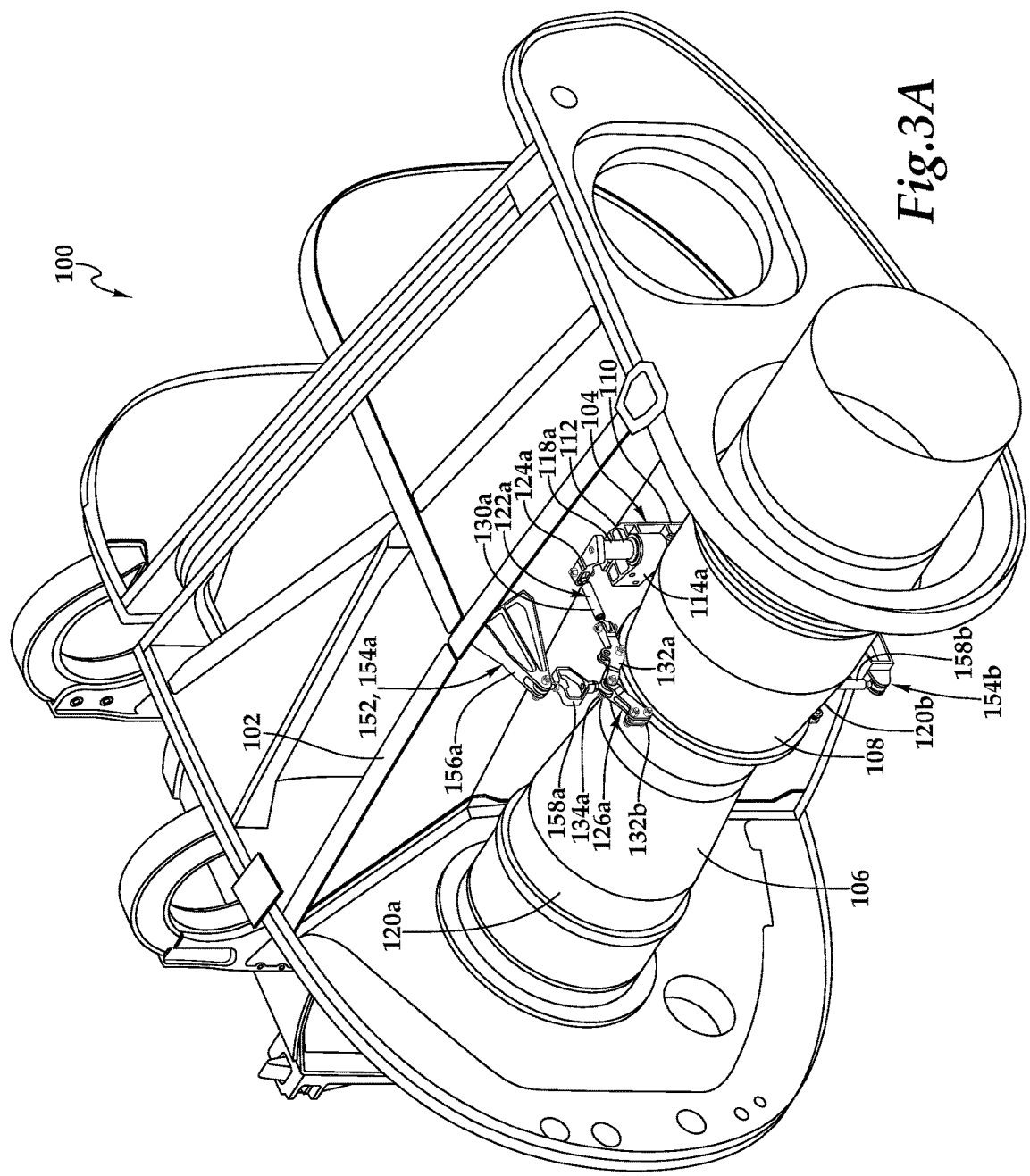
FIG. 3A is an isometric view of a fixed pylon in which an engine is mounted using an engine mount assembly in accordance with embodiments of the present disclosure.
Figure 3B:
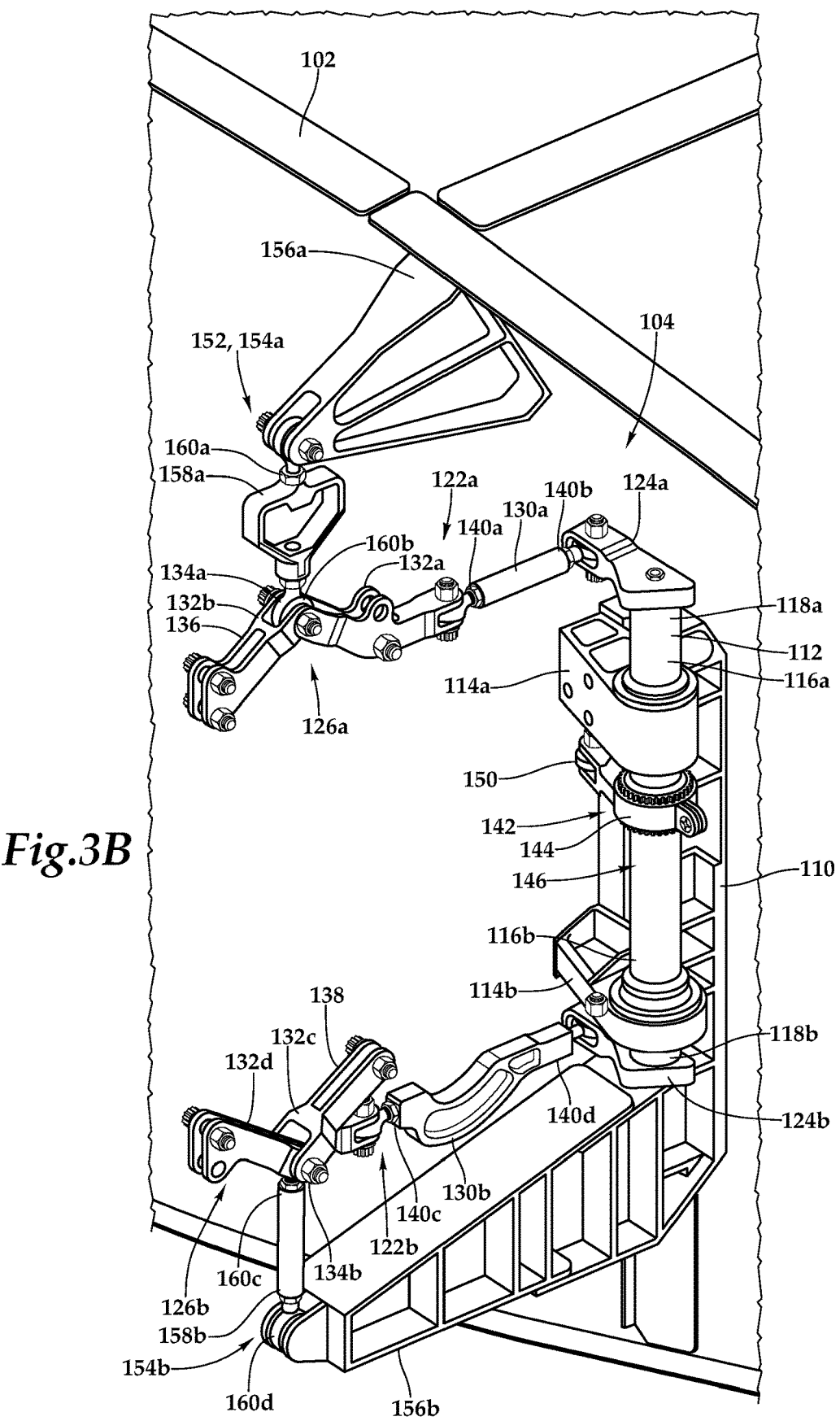
FIGS. 3B-3D are various views of an engine mount assembly in accordance with embodiments of the present disclosure.
Figure 3C:
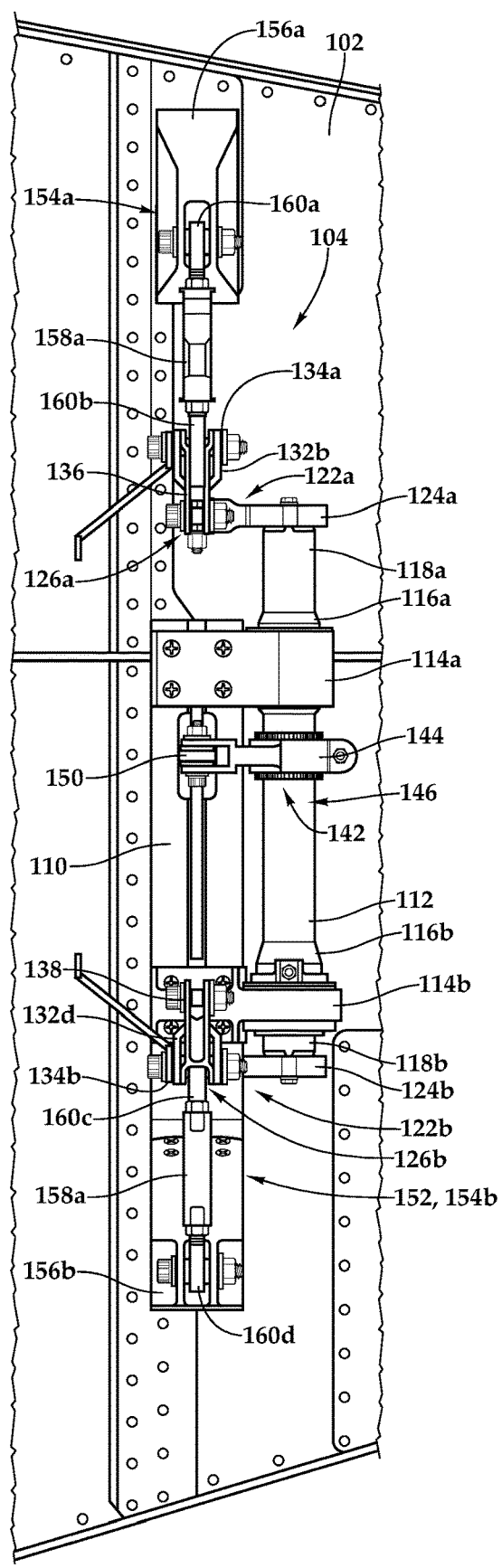
Figure 3D:
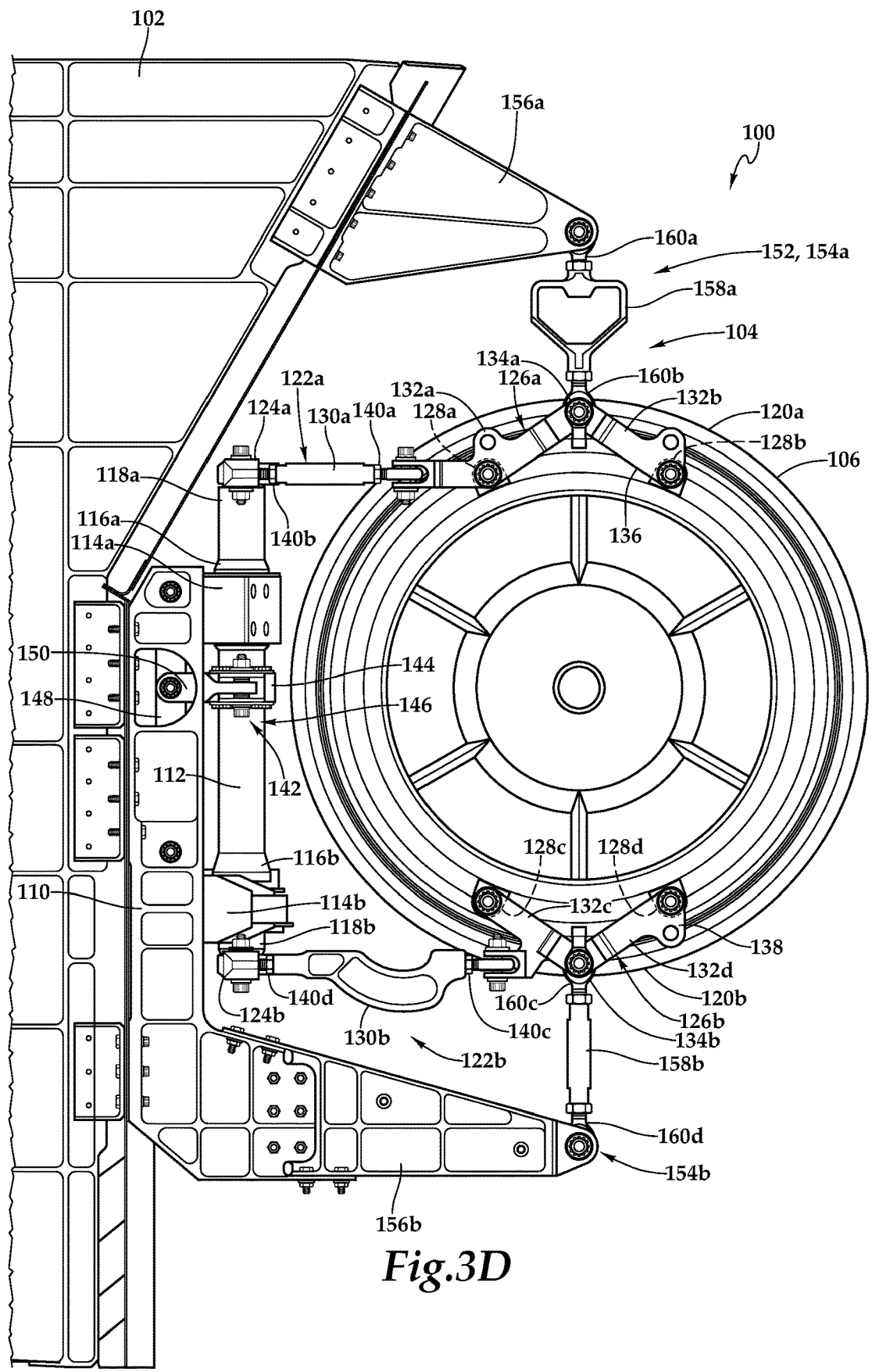

Referring now to FIGS. 2A-2B, propulsion assembly 20a is disclosed in further detail. Propulsion assembly 20a is substantially similar to propulsion assembly 20b therefore, for sake of efficiency, certain features will be disclosed only with regard to propulsion assembly 20a. One having ordinary skill in the art, however, will fully appreciate an understanding of propulsion assembly 20b based upon the disclosure herein of propulsion assembly 20a. Engine 24 of propulsion assembly 20a is substantially fixed relative to wing 18, although some motion of engine 24 occurs during operation. In particular, engine mount assembly 32 allows for the controlled motion of engine 24. An engine output shaft 34 transfers power from engine 24 to a spiral bevel gearbox 36 that includes spiral bevel gears to change torque direction by 90 degrees from engine 24 to a fixed gearbox 38 via a clutch. Fixed gearbox 38 includes a plurality of gears, such as helical gears, in a gear train that are coupled to an interconnect drive shaft 40 and a quill shaft (not visible) that supplies torque to an input in spindle gearbox 42 of proprotor gearbox 44. Interconnect drive shaft 40 provides a torque path that enables a single engine of aircraft 10 to provide torque to both proprotor assemblies 30a, 30b in the event of a failure of the other engine. In the illustrated embodiment, interconnect drive shaft 40 includes a plurality of segments that share a common rotational axis.

Engine 24 is housed and supported in fixed pylon 22a (see FIGS. 1A-1B) that may include features such as an inlet, aerodynamic fairings and exhaust, as well as other structures and systems to support and facilitate the operation of engine 24. The airframe of aircraft 10, which supports the various sections of aircraft 10 including fuselage 12, includes a propulsion assembly airframe section 46 that supports propulsion assembly 20a. Engine mount assembly 32 is coupled to propulsion assembly airframe section 46 to support engine 24. Proprotor assembly 30a of propulsion assembly 20a includes three rotor blades 48a, 48b, 48c that are coupled to a rotor hub 50. Rotor hub 50 is coupled to a mast 52 that is coupled to proprotor gearbox 44. Together, spindle gearbox 42, proprotor gearbox 44 and mast 52 are part of mast assembly 28a that rotates relative to fixed pylon 22a. In addition, it should be appreciated by those having ordinary skill in the art that mast assembly 28a may include different or additional components, such as a pitch control assembly depicted as swashplate 54, actuators 56 and pitch links 58, wherein swashplate 54 is selectively actuated by actuators 56 to selectively control the collective pitch and the cyclic pitch of rotor blades 48a, 48b, 48c via pitch links 58. A linear actuator, depicted as conversion actuator 60 of fixed pylon 22a, is operable to reversibly rotate mast assembly 28a relative to fixed pylon 22a, which in turn selectively positions proprotor assembly 30a between forward flight mode, in which proprotor assembly 30a is rotating in a substantially vertical plane, and VTOL flight mode, in which proprotor assembly 30a is rotating in a substantially horizontal plane.

It should be appreciated that aircraft 10 is merely illustrative of a variety of aircraft that can implement the embodiments disclosed herein. Indeed, engine mount assembly 32 may be utilized on any aircraft having one or more engines. Other aircraft implementations can include hybrid aircraft, tiltwing aircraft, quad tiltrotor aircraft, unmanned aircraft, gyrocopters, airplanes, jets, helicopters and the like. As such, those of ordinary skill in the art will recognize that engine mount assembly 32 can be integrated into a variety of aircraft configurations. It should be appreciated that even though aircraft are particularly well-suited to implement the embodiments of the present disclosure, non-aircraft vehicles and devices can also implement the embodiments, including, but not limited to, automobiles or land-based vehicles.

Referring to FIGS. 3A-3D, 4A-4D, 5A-5D, 6A-6D, 7A-7D and 8A-8B in the drawings, a propulsion assembly including an engine mount assembly is generally designated 100. Propulsion assembly 100 includes airframe 102. The illustrated portion of airframe 102 is a section of the airframe for the aircraft that supports propulsion assembly 100. Engine mount assembly 104 mounts engine 106 to airframe 102. In the illustrated embodiment, engine mount assembly 104 attaches to aft portion 108 of engine 106, although engine mount assembly 104, in other embodiments, may attach to any portion of engine 106. Engine 106 is subject to lateral movement, as shown in FIGS. 4A-4D and 5A-5D, torsional movement, as shown in FIGS. 6A-6D and 7A-7D, and vertical movement, as shown in FIGS. 8A-8B. Lateral, torsional and vertical movement includes, but is not limited to, lateral, torsional and vertical vibration, modes of vibration or other oscillatory motion, respectively. Engine mount assembly 104 is capable of independently tailoring stiffness along the lateral, torsional and vertical load paths of engine 106 to allow for independent control of the lateral, torsional and vertical movement of engine 106.

Engine mount assembly 104 includes a support spine 110 coupled to airframe 102. A torsion bar 112 is vertically mounted within propulsion assembly 100, and is rotatably coupled to support spine 110 by upper and lower torsion bar bearing mounts 114a, 114b. Upper and lower torsion bar bearing mounts 114a, 114b are rotatably coupled to upper and lower portions 116a, 116b of torsion bar 112, respectively, to permit axial rotation of torsion bar 112 about its longitudinal axis. The interface between torsion bar 112 and upper and lower torsion bar bearing mounts 114a, 114b may include bearings to facilitate the rotation of torsion bar 112. Upper and lower torsion bar bearing mounts 114a, 114b are fixedly coupled to support spine 110.

Torsion bar 112 is coupled to engine 106. When torsion bar 112 experiences torsion, torsion bar 112 has a torsional stiffness that is capable of independently controlling torsional movement of engine 106. Top and bottom ends 118a, 118b of torsion bar 112 are coupled to top and bottom sides 120a, 120b of engine 106 by top and bottom arm assemblies 122a, 122b, respectively. Top arm assembly 122a includes top end bell crank 124a fixedly coupled to top end 118a of torsion bar 112, a top scissor mount 126a coupled to top engine lugs 128a, 128b on top side 120a of engine 106 and a top linkage 130a coupling top end bell crank 124a to top scissor mount 126a. Bottom arm assembly 122b includes bottom end bell crank 124b fixedly coupled to bottom end 118b of torsion bar 112, bottom scissor mount 126b coupled to bottom engine lugs 128c, 128d on bottom side 120b of engine 106 and bottom linkage 130b coupling bottom end bell crank 124b to bottom scissor mount 126b. Loads caused by lateral and torsional movement of engine 106 are transferred to torsion bar 112 via top and bottom arm assemblies 122a, 122b.

Top scissor mount 126a includes blades 132a, 132b rotatably coupled to one another at a fulcrum 134a. Blades 132a, 132b are each bifurcated into tines 136 between which top engine lugs 128a, 128b may be interposed. Bottom scissor mount 126b includes blades 132c, 132d rotatably coupled to one another at fulcrum 134b. Blades 132c, 132d each bifurcate into tines 138 between which bottom engine lugs 128c, 128d may be interposed. The rotatable connection between blades 132a, 132b at fulcrum 134a for top scissor mount 126a and between blades 132c, 132d at fulcrum 134b for bottom scissor mount 126b prevents stresses and loads on engine 106 by allowing scissor mounts 126a, 126b to open and close in response to, for example, thermal expansion of engine 106. Any bolt, pin or other fastener may be used at fulcrums 134a, 134b that allows for blades 132a, 132b and blades 132c, 132d to rotate relative to one another, respectively. Ends 140a, 140b of top linkage 130a may be movably coupled to top scissor mount 126a and top end bell crank 124a via spherical bearings. Likewise, ends 140c, 140d of bottom linkage 130b may be movably coupled to bottom scissor mount 126b and bottom end bell crank 124b via spherical bearings. The spherical bearings located at ends 140a, 140b, 140c, 140d of linkages 130a, 130b allow top and bottom arm assemblies 122a, 122b to accommodate vertical and fore-aft movement of engine 106. For example, when engine 106 moves vertically, as shown in FIGS. 8A-8B, the spherical bearings allow linkages 130a, 130b to rotate up and down relative to end bell cranks 124a, 124b, respectively, so that vertical motion may be accommodated by top and bottom arm assemblies 122a, 122b.

Engine mount assembly 104 includes a lateral movement control assembly 142 coupled to torsion bar 112. Lateral movement control assembly 142, or a portion thereof, has a lateral stiffness that controls lateral movement of engine 106. Lateral movement control assembly 142 includes a middle bell crank 144 fixedly coupled to a middle section 146 of torsion bar 112. Middle bell crank 144 may be fixedly coupled at the midpoint of torsion bar 112, or, as illustrated, may be slightly offset from the midpoint of torsion bar 112. For example, for a torsion bar measuring approximately 18 inches in length, middle bell crank 144 may be offset from the midpoint of torsion bar 112 by 3 inches or less. In this example, middle bell crank 144 may be offset from the midpoint of torsion bar 112 by 1-2 inches. Middle bell crank 144 is coupled to a spring 148 by a lateral link 150. In some embodiments, middle bell crank 144 may be coupled to lateral link 150 via a spherical bearing, thereby allowing for a range of motion between middle bell crank 144 and lateral link 150 in multiple degrees of freedom. When engine 106 moves laterally, torsion bar 112 rotates and middle bell crank 144 transfers the rotational energy of torsion bar 112 to spring 148. Spring 148 has a lateral stiffness that controls or restrains lateral movement of engine 106. Spring 148 may be any type of spring, such as a coiled spring, leaf spring or flexure, and may be made of any material such as elastomer, silicone, composite or metal. Indeed, spring 148 may be any shape, and be made from any material, capable of being compressed or stretched to provide a suitable stiffness or elasticity to control the lateral movement of engine 106. In other embodiments, more than one spring may be utilized to obtain a lateral stiffness for the lateral movement control assembly 142.

Engine mount assembly 104 includes a vertical movement control assembly 152 that has a vertical stiffness to independently control the vertical movement of engine 106. Vertical movement control assembly 152 is divided into a top vertical movement control assembly 154a coupled to top side 120a of engine 106 via top scissor mount 126a and bottom vertical movement control assembly 154b coupled to bottom side 120b of engine 106 via bottom scissor mount 126b. Top vertical movement control assembly 154a includes a top support arm 156a fixedly coupled to airframe 102. Top support arm 156a is coupled to top scissor mount 126a by a top vertical support linkage 158a. Top end 160a of top vertical support linkage 158a is coupled to top support arm 156a and bottom end 160b of top vertical support linkage 158a is coupled to fulcrum 134a of top scissor mount 126a. In some embodiments, top end 160a of top vertical support linkage 158a is movably coupled to top support arm 156a via a spherical bearing and bottom end 160b of top vertical support linkage 158a is movably coupled to fulcrum 134a of top scissor mount 126a via a spherical bearing to permit engine 106 to move in multiple degrees of freedom, including the fore-aft direction.

Bottom vertical movement control assembly 154b includes bottom support arm 156b fixedly coupled to support spine 110. In other embodiments, bottom support arm 156b may be directly coupled to airframe 102. In yet other embodiments, support spine 110 and bottom support arm 156b may be a single part formed from the same piece of material. Bottom vertical movement control assembly 154b includes bottom vertical support linkage 158b coupling bottom support arm 156b to bottom side 120b of engine 106 via bottom scissor mount 126b. Top end 160c of bottom vertical support linkage 158b is coupled to fulcrum 134b of bottom scissor mount 126b and bottom end 160d of bottom vertical support linkage 158b is coupled to bottom support arm 156b. In some embodiments, ends 160c, 160d of bottom vertical support linkage 158b may each be coupled to fulcrum 134b and bottom support arm 156b, respectively, via spherical bearings to permit engine 106 to move in multiple degrees of freedom, including the fore-aft direction. Top vertical support linkage 158a has a loop structure and bottom vertical support linkage 158b has a linear structure. In other embodiments, however, either or both of top or bottom vertical support linkages 158a, 158b may have a looped, linear or any other structure suitable for the application. Both the top and bottom vertical movement control assemblies 154a, 154b have vertical stiffnesses that may be selected to control vertical movement of engine 106.

Referring specifically to FIGS. 4A-4D, 5A-5D, 6A-6D, 7A-7D and 8A-8B, engine mount assembly 104 operates to provide different load paths for lateral, torsional and vertical movement of engine 106 so that the stiffnesses in each of these directions are decoupled, or independently controlled, from one another. In particular, lateral movement of engine 106, as illustrated in FIGS. 4A-4D and 5A-5D is independently controllable based on the lateral stiffness of spring 148. Torsional movement of engine 106, as shown in FIGS. 6A-6D and 7A-7D, is independently controllable based on the torsional stiffness of torsion bar 112. The vertical movement of engine 106, as shown in FIGS. 8A-8B, is independently controllable based on the vertical stiffnesses of top and bottom vertical movement control assemblies 154a, 154b. Because the lateral, torsional and vertical load paths are stiffened by different elements of engine mount assembly 104, movement, including vibration, of engine 106 in the lateral, torsional and vertical directions may be controlled independently of one another to allow for the fine tuning of stiffnesses in each of these directions to meet operational parameters or constraints.

Referring specifically to FIGS. 4A-4D and 5A-5D, the lateral load path of engine mount assembly 104 is illustrated. When engine 106 is at rest and experiences no movement or vibration, engine 106 is in a neutral position 162. When engine 106 moves to an outer lateral position 164, as shown in FIG. 4A, such movement is transferred through top and bottom arm assemblies 122a, 122b to rotate end bell cranks 124a, 124b in the same direction that engine 106 has moved. End bell cranks 124a, 124b rotate in the same direction away from support spine 110 as best seen in FIGS. 4B and 4D. Because end bell cranks 124a, 124b are fixedly coupled to ends 118a, 118b of torsion bar 112, respectively, torsion bar 112 rotates in the same direction as end bell cranks 124a, 124b. Middle bell crank 144, by virtue of being fixedly coupled to middle section 146 of torsion bar 112, rotates in the same direction as end bell cranks 124a, 124b and torsion bar 112, thus transferring the rotational energy of torsion bar 112 to spring 148. The rotation of middle bell crank 144 in the same direction as end bell cranks 124a, 124b is best seen in FIG. 4C. Conversely, when engine 106 moves to an inner lateral position 166, as shown in FIG. 5A, end bell cranks 124a, 124b and middle bell crank 144 all rotate in the same direction of movement of engine 106 and toward support spine 110, as shown in FIGS. 5B-5D. Thus, the lateral load path of engine mount assembly 104 is directed to spring 148, whose lateral stiffness controls the lateral movement of engine 106. A suitable lateral stiffness of spring 148 may be obtained by varying the shape of spring 148 or the material from which spring 148 is composed. In this manner, lateral movement of engine 106 is controlled independently from torsional and vertical movement of engine 106. Thus, changing the lateral stiffness of spring 148 does not substantially affect the torsional and vertical movement of engine 106.

Referring specifically to FIGS. 6A-6D and 7A-7D, the torsional load path of engine mount assembly 104 is illustrated. Engine 106 oscillates about engine axis 168 from neutral position 162, in which engine 106 is substantially vertical. In FIG. 6A, top side 120a of engine 106 has tilted away from torsion bar 112 while bottom side 120b of engine 106 has tilted toward torsion bar 112, thus causing end bell cranks 124a, 124b to rotate in opposite directions, as shown in FIGS. 6B and 6D. End bell cranks 124a, 124b also move in opposite directions when top side 120a of engine 106 tilts toward torsion bar 112 and bottom side 120b of engine 106 tilts away from torsion bar 112, as shown in FIGS. 7A-7D. When torsional movement of engine 106 causes end bell cranks 124a, 124b to rotate in opposite directions, torsion bar 112 experiences torsion. Thus, the torsional stiffness of torsion bar 112 controls the torsional movement of engine 106. In some embodiments, torsional stiffness of torsion bar 112 may be expressed as GJ/L, wherein G is the rigidity modulus of the material from which torsion bar 112 is made, J is the torsion constant for torsion bar 112 and L is the length of torsion bar 112.

The torsional stiffness of torsion bar 112 may be varied to achieve a desired amount of torsional movement for engine 106. For example, the diameter of torsion bar 112 may be increased to decrease the torsional movement of engine 106. Conversely, the diameter of torsion bar 112 may be decreased to allow additional torsional movement for engine 106. Also, while torsion bar 112 is illustrated as having a generally cylindrical shape, torsion bar 112 may have a cross-sectional shape other than a circle, such as a square, polygon or other shape. The shape of torsion bar 112 may be varied to change the torsional stiffness of torsion bar 112. The torsional stiffness of torsion bar 112 may also be varied by changing the material from which torsion bar 112 is made. In some embodiments, torsion bar 112 may be a metal or composite tube or rod. For example, torsion bar 112 may be formed from steel, such as stainless steel. Torsion bar 112 may also be any length depending on the application, and may be affected by the size of engine 106 or engine mount assembly 104, as well as other factors.

The torsional load path of engine mount assembly 104 is directed to torsion bar 112 such that torsional movement of engine 106 is controlled by the torsional stiffness of torsion bar 112. Torsion bar 112 transmits the lateral motion of engine 106 to spring 148, but self-reacts to torsional movement of engine 106. Middle bell crank 144, by virtue of being located in middle section 146 of torsion bar 112, is substantially stationary when engine 106 experiences torsional movement, as shown in FIGS. 6C and 7C, and thus does not exert a force upon spring 148. Thus, torsional movement of engine 106 is controlled independently of lateral movement of engine 106. The torsional stiffness of torsion bar 112, while controlling torsional movement of engine 106, does not substantially affect lateral and vertical movement of engine 106. Thus, torsion bar 112 can be designed or selected so as to achieve desired tuning in the torsional load direction.

Referring to FIGS. 8A and 8B, the vertical load path of engine mount assembly 104 is illustrated. In FIG. 8A, engine 106 has moved downward from neutral position 162, thereby stretching top vertical movement control assembly 154a and compressing bottom vertical movement control assembly 154b. In FIG. 8B, engine 106 has moved upward of neutral position 162, thereby compressing top vertical movement control assembly 154a and stretching bottom vertical movement control assembly 154b. The vertical stiffnesses of top and bottom vertical movement control assemblies 154a, 154b, including support arms 156a, 156b and vertical support linkages 158a, 158b, control vertical movement of engine 106 independent of lateral or torsional movement of engine 106. Utilizing stiffer materials or shapes for support arms 156a, 156b and vertical support linkages 158a, 158b limits vertical movement of engine 106, while more elastic materials or shapes for support arms 156a, 156b or vertical support linkages 158a, 158b permits more vertical movement of engine 106. Vertical support linkages 158a, 158b may be made from elastomer, silicone, composite, metal or other suitable materials. In some embodiments, support arms 156a, 156b or vertical support linkages 158a, 158b may be made from titanium or steel, such as stainless steel. Vertical support linkages 158a, 158b may also be metal flexures. Because vertical motion of engine 106 is controlled by the stiffness of vertical movement control assemblies 154a, 154b, while torsional motion of engine 106 is controlled by the torsional stiffness of torsion bar 112 and lateral motion of engine 106 is controlled by the lateral stiffness of spring 148, vertical motion of engine 106 is controlled independently of both lateral and vertical movement of engine 106.

Thus, the lateral, torsional and vertical load paths are each directed to different elements of engine mount assembly 104, namely spring 148, torsion bar 112 and vertical movement control assembly 152, thus allowing individual stiffness tailoring of the lateral, torsional and vertical load paths. The stiffness of the lateral load path can be tailored by design of spring 148, the stiffness of the torsional load path can be tailored by design of torsion bar 112, and the stiffness of the vertical load path can be tailored by design of the vertical movement control assembly 152. By using the illustrative embodiments, placement of the engine's natural frequencies may be tailored to the particular application. Individual stiffness targets or ranges in the lateral, torsional or vertical directions may be more easily met since the adjustment of stiffness in any one of these directions does not affect the other two. In effect, stiffness in any one of the lateral, torsional or vertical directions can be isolated or decoupled from the stiffness in the other two directions. In contrast, previous engine mounting configurations cannot independently tune each of the fundamental lateral, torsional and vertical engine modes of vibration. For example, stiffening one load path in these previous systems to increase a desired engine mode would subsequently increase the mode placement of the other coupled direction, thus making stiffness tailoring for dynamic tuning difficult or even impossible to achieve. It will be appreciated by one of ordinary skill in the art that lateral, torsional and vertical movement of engine 106 encompasses lateral, torsional and vertical modes of vibration of engine 106 such that the modes of vibration in each of these directions may be independently controlled by the illustrative embodiments. Thus, undesirable modes of vibration in any of these directions may be eliminated using the illustrative embodiments. By way of non-limiting example, the frequency of oscillation of engine 106 in any of the lateral, torsional or vertical directions may be kept in a range of 12-14 Hz to eliminate interference with a vibrational mode from another structure of the aircraft.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An engine mount assembly for coupling an engine to an airframe, the engine subject to torsional and lateral movement, the engine mount assembly comprising:
   a torsion bar coupled between the engine and the airframe, the torsion bar having a torsional stiffness and experiencing torsion in response to torsional movement of the engine such that torsional movement of the engine is controllable based on the torsional stiffness of the torsion bar; and
   a lateral movement control assembly coupled between the torsion bar and the airframe, the lateral movement control assembly having a lateral stiffness, the torsion bar rotating in response to lateral movement of the engine and the lateral movement control assembly reacting to the rotation of the torsion bar such that lateral movement of the engine is controllable based on the lateral stiffness of the lateral movement control assembly, thereby enabling torsional and lateral movement of the engine to be independently controlled;

wherein, the lateral movement control assembly includes a middle bell crank fixedly coupled to the torsion bar and a spring coupled to the middle bell crank, the spring having the lateral stiffness to control lateral movement of the engine.

2. The engine mount assembly as recited in claim 1 wherein the engine is further subject to vertical movement; and wherein torsional movement of the engine is independently controllable based on the torsional stiffness of the torsion bar such that lateral and vertical movement of the engine is substantially unaffected by the torsional stiffness of the torsion bar.

3. The engine mount assembly as recited in claim 1 wherein torsional movement of the engine further comprises a torsional mode of vibration of the engine; and wherein the torsional mode of vibration of the engine is independently controllable based on the torsional stiffness of the torsion bar.

4. The engine mount assembly as recited in claim 1 further comprising:

a support spine coupled to the airframe; and at least one torsion bar bearing mount coupled to the support spine, the at least one torsion bar bearing mount rotatably coupled to the torsion bar.

5. The engine mount assembly as recited in claim 4 wherein the torsion bar further comprises upper and lower portions; and wherein the at least one torsion bar bearing mount further comprises an upper torsion bar bearing mount and a lower torsion bar bearing mount, the upper torsion bar bearing mount rotatably coupled to the upper portion of the torsion bar and the lower torsion bar bearing mount rotatably coupled to the lower portion of the torsion bar.

6. The engine mount assembly as recited in claim 1 further comprising:

a first arm assembly coupling a first end of the torsion bar to the engine; and a second arm assembly coupling a second end of the torsion bar to the engine.

7. The engine mount assembly as recited in claim 6 wherein the engine further comprises top and bottom sides;

wherein the torsion bar is mounted vertically such that the first and second ends of the torsion bar further comprise top and bottom ends, respectively;

wherein the first arm assembly further comprises a top arm assembly coupling the top end of the torsion bar to the top side of the engine; and wherein the second arm assembly further comprises a bottom arm assembly coupling the bottom end of the torsion bar to the bottom side of the engine.

8. The engine mount assembly as recited in claim 6 wherein the first and second arm assemblies each further comprise:

a scissor mount attachable to the engine;

an end bell crank coupled to one of the ends of the torsion bar; and a linkage coupling the scissor mount to the end bell crank.

9. The engine mount assembly as recited in claim 8 wherein the first and second arm assemblies each further comprise:

first and second spherical bearings;

wherein, for each of the first and second arm assemblies, the linkage further comprises first and second ends, the first end of the linkage movably coupled to the scissor mount via the first spherical bearing, the second end of the linkage movably coupled to the end bell crank via the second spherical bearing.

10. The engine mount assembly as recited in claim 8 wherein the end bell cranks are each fixedly coupled to one of the ends of the torsion bar;

wherein torsional movement of the engine causes the end bell cranks to rotate in opposite directions, thereby causing the torsion bar to experience torsion; and wherein lateral movement of the engine causes the end bell cranks to rotate in the same direction, thereby causing the torsion bar to rotate.

11. An engine mount assembly for coupling an engine to an airframe, the engine subject to torsional and lateral movement, the engine mount assembly comprising:

a torsion bar coupled between the engine and the airframe, the torsion bar having a torsional stiffness and experiencing torsion in response to torsional movement of the engine such that torsional movement of the engine is controllable based on the torsional stiffness of the torsion bar; and a lateral movement control assembly coupled between the torsion bar and the airframe, the lateral movement control assembly having a lateral stiffness, the torsion bar rotating in response to lateral movement of the engine and the lateral movement control assembly reacting to the rotation of the torsion bar such that lateral movement of the engine is controllable based on the lateral stiffness of the lateral movement control assembly, thereby enabling torsional and lateral movement of the engine to be independently controlled;

wherein, the torsion bar includes a middle section;

wherein, the lateral movement control assembly includes a middle bell crank fixedly coupled to the middle section of the torsion bar;

wherein, the middle bell crank rotates in response to rotation of the torsion bar caused by lateral movement of the engine; and wherein, the middle bell crank is substantially stationary in response to torsion of the torsion bar caused by torsional movement of the engine.

12. The engine mount assembly as recited in claim 11 wherein the lateral movement control assembly further comprises:

a spring coupled to the middle bell crank, the spring having the lateral stiffness to control lateral movement of the engine.

13. The engine mount assembly as recited in claim 11 wherein the engine is subject to lateral and torsional modes of vibration; and wherein the lateral mode of vibration of the engine is controllable based on the lateral stiffness of the lateral movement control assembly and the torsional mode of vibration of the engine is controllable based on the torsional stiffness of the torsion bar, thereby enabling the lateral and torsional modes of vibration to be independently controlled.

14. An engine mount assembly for coupling an engine to an airframe, the engine subject to torsional, lateral and vertical movement, the engine mount assembly comprising:

a torsion bar coupled between the engine and the airframe, the torsion bar having a torsional stiffness and experiencing torsion in response to torsional movement of the engine such that torsional movement of the engine is controllable based on the torsional stiffness of the torsion bar;

a lateral movement control assembly coupled between the torsion bar and the airframe, the lateral movement control assembly having a lateral stiffness, the torsion bar rotating in response to lateral movement of the engine and the lateral movement control assembly reacting to the rotation of the torsion bar such that lateral movement of the engine is controllable based on the lateral stiffness of the lateral movement control assembly; and a vertical movement control assembly coupled between the engine and the airframe, the vertical movement control assembly having a vertical stiffness such that vertical movement of the engine is controllable based on the vertical stiffness of the vertical movement control assembly, thereby enabling torsional, lateral and vertical movement of the engine to be independently controlled;

wherein, the vertical movement control assembly includes a top vertical movement control assembly coupled between a top side of the engine and the airframe including a top support arm coupled to the airframe and a top vertical support linkage coupling the top support arm to the top side of the engine;

wherein, the vertical movement control assembly includes a bottom vertical movement control assembly coupled between a bottom side of the engine and the airframe including a bottom support arm coupled to the airframe and a bottom vertical support linkage coupling the bottom support arm to the bottom side of the engine, the top and bottom vertical movement control assemblies each having a vertical stiffness; and wherein, vertical movement of the engine is controllable based on the vertical stiffness of the top and bottom vertical movement control assemblies.

15. The engine mount assembly as recited in claim 14 further comprising:

top and bottom scissor mounts coupled to the top and bottom sides of the engine, respectively;

wherein the top vertical support linkage is coupled to the top side of the engine via the top scissor mount and the bottom vertical support linkage is coupled to the bottom side of the engine via the bottom scissor mount.

16. The engine mount assembly as recited in claim 15 further comprising:

first, second, third and fourth spherical bearings;

wherein the top and bottom scissor mounts each further comprise a fulcrum;

wherein the top and bottom vertical support linkages each further comprise top and bottom ends; and wherein the top end of the top vertical support linkage is moveably coupled to the top support arm via the first spherical bearing, the bottom end of the top vertical support linkage is moveably coupled to the fulcrum of the top scissor mount via the second spherical bearing, the top end of the bottom vertical support linkage is moveably coupled to the fulcrum of the bottom scissor mount via the third spherical bearing and the bottom end of the bottom vertical support linkage is moveably coupled to the bottom support arm via the fourth spherical bearing.

\* \* \* \* \*